United States Patent Office.

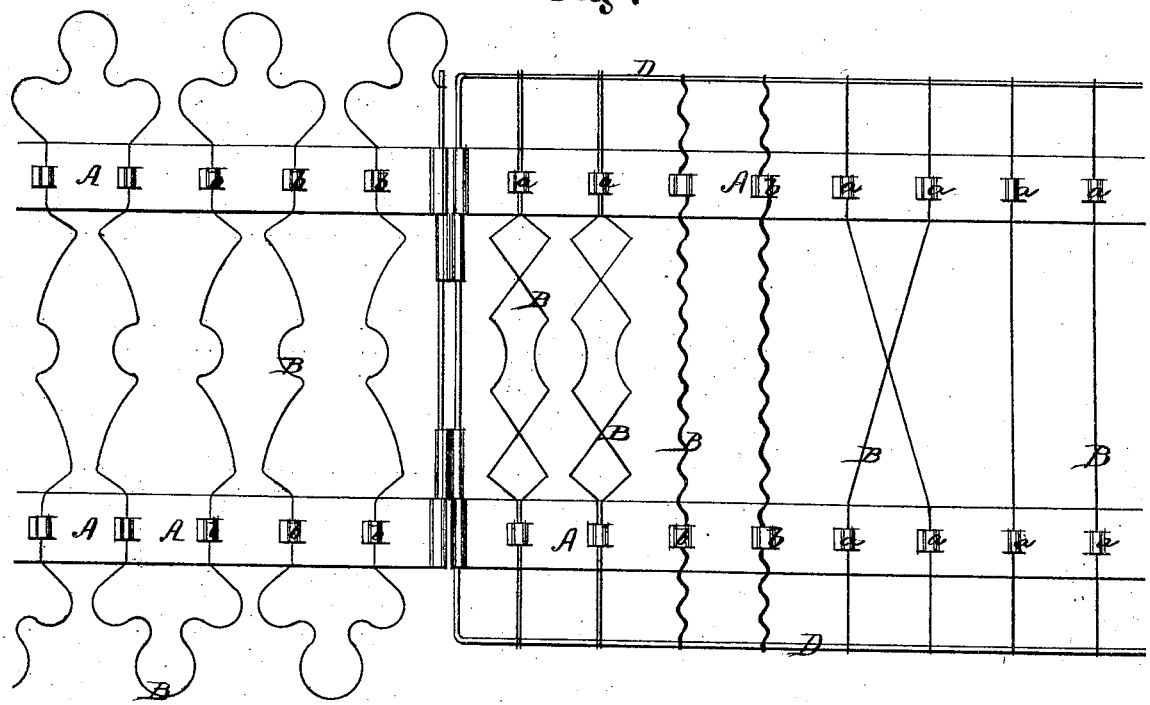
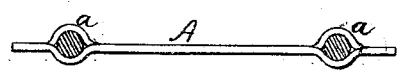
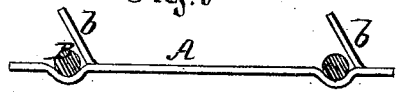
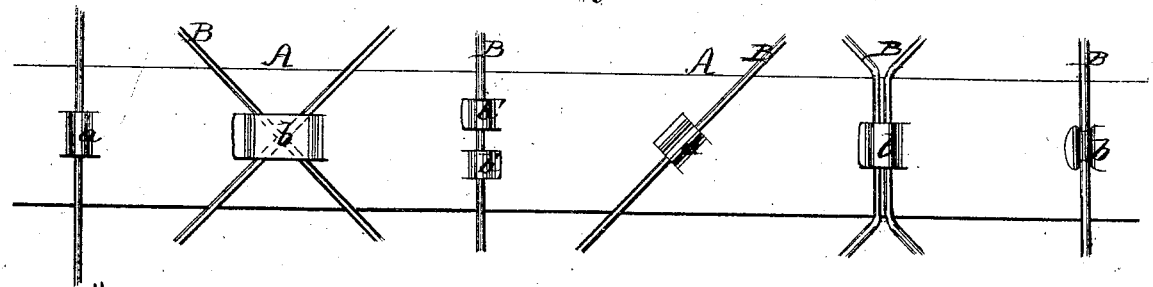

WANNIBALD R. BOERNER, OF CHICAGO, ILLINOIS, ASSIGNOR TO HIMSELF AND C. R. BOERNER, OF SAME PLACE.

Letters Patent No. 101,816, dated April 12, 1870.

IMPROVEMENT IN WIRE-WORK FOR RAILINGS, &c.

The Schedule referred to in these Letters Patent and making part of the same.

*To all whom it may concern:*

Be it known that I, WANNIBALD R. BOERNER, of Chicago, in the county of Cook and State of Illinois, have invented certain Improvements in Wire-Work for Railings, Fences, and similar articles, of which the following is a specification, reference being had to the accompanying drawings.

My invention relates to articles made or formed of wire, such as railings, fences, and similar articles, and consists in a novel manner of securing the wires to longitudinal strips or bars of flat iron, which serve to support and hold them in position.

Figure 1 is a side elevation of a railing constructed on my plan, several different forms of the wire being shown;

Figure 2, a plan or edge view of the longitudinal strip, showing the eyes formed in or on it and the wires passing through them;

Figure 3, a modification of the fastening for curved or bent wires, an ear or point being substituted for the eyes or loops; and Figure 4 is a side view of the longitudinal strip, with wires of different forms and in different positions secured to it.

When I desire produce a railing composed of straight wires I provide iron bars or strips A, and, at the desired points, by means of any suitable tools or devices, punch through or "set up" the metal so as to form projecting eyes or loops on one side, as shown in figs. 1, 2, and 4, through which the wires may be passed, as shown in fig. 2. These loops may be made of any desired size, and in any position to correspond with the angle or inclination at which the wires cross the bars A.

After having formed the eyes or loops on the bars, I take two or more of the bars and arrange them at the proper distance apart, and then pass the wire or wires through the eyes from one bar to the other, and then flatten or compress the eyes upon and around the wires, which are thus securely held in place.

These wires may be allowed to project beyond the bars without being attached to any other fastening, or a surrounding wire frame, D, may be provided, and the wires have their ends secured thereto, as shown on the right side of fig. 1, this frame being held in position by bending the bars A over the same, as shown.

When I desire to construct a fancy or ornamental railing with curved or bent wires which can not be passed through the eyes, I form, instead of said eyes, ears or points *b* by punching through portions of the bar so as to project on the opposite side and be free at one end, as shown in fig. 3. When these ears are used the wires are bent or curved, as desired, and placed in the proper position against the bars A, and then the lips turned down over and compressed upon the wires, and thus answer the same purpose as the solid loop. If desired, two or more of the ears may be used at one point, being turned over the wire from opposite sides, as shown at *a'*, fig. 4.

Two or more wires may be passed under one loop or ear, either side by side or crossed over one another, as shown in figs. 1 and 4. Where the ears or points *b* are used the railing may be made of a single continuous wire bent back and forth, as shown in fig. 1.

My method, thus described, is applicable alike to large articles, as railings, fences, &c., and to smaller articles, as bird-cages, baskets for flowers, and similar purposes.

Having thus described my invention,
What I claim is—

The herein-described method of securing the wire or wires to their supports or rails by means of the loops or ears, substantially as set forth.

W. R. BOERNER.

Witnesses:
 WM. H. LOTZ,
 CHRISTIAN B. MEYER.